United States Patent

Ross et al.

(10) Patent No.: US 8,238,217 B2
(45) Date of Patent: Aug. 7, 2012

(54) METHOD AND SYSTEM FOR DETECTION ENHANCEMENT FOR OPTICAL DATA STORAGE

(75) Inventors: John Anderson Fergus Ross, Niskayuna, NY (US); Xiaolei Shi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 632 days.

(21) Appl. No.: 12/336,414

(22) Filed: Dec. 16, 2008

(65) Prior Publication Data

US 2010/0149957 A1  Jun. 17, 2010

(51) Int. Cl.
*G11B 7/0065* (2006.01)

(52) U.S. Cl. ........................................ 369/103

(58) Field of Classification Search .................. None
See application file for complete search history.

(56) References Cited

U.S. PATENT DOCUMENTS

| | | | |
|---|---|---|---|
| 5,450,218 A | 9/1995 | Heanue et al. | |
| 5,510,912 A | 4/1996 | Blaum et al. | |
| 5,701,283 A * | 12/1997 | Alon et al. | 369/44.41 |
| 5,727,226 A | 3/1998 | Blaum et al. | |
| 5,808,998 A | 9/1998 | Curtis et al. | |
| 6,175,317 B1 | 1/2001 | Ordentlich et al. | |
| 6,549,664 B1 | 4/2003 | Daiber et al. | |
| 6,563,779 B1 | 5/2003 | McDonald et al. | |
| 6,711,711 B2 | 3/2004 | Hwang | |
| 6,738,322 B2 | 5/2004 | Amble et al. | |
| 6,859,425 B2 * | 2/2005 | Maegawa et al. | 369/47.3 |
| 6,889,907 B2 | 5/2005 | Roh | |
| 7,020,054 B2 | 3/2006 | Kadlec et al. | |
| 7,388,695 B2 | 6/2008 | Lawrence et al. | |
| 2002/0172131 A1 | 11/2002 | Burr | |
| 2005/0136333 A1 | 6/2005 | Lawrence et al. | |
| 2005/0286388 A1 * | 12/2005 | Ayres et al. | 369/103 |
| 2006/0002274 A1 | 1/2006 | Kihara et al. | |
| 2006/0073392 A1 | 4/2006 | Erben et al. | |

(Continued)

FOREIGN PATENT DOCUMENTS

WO            9939248         8/1999

(Continued)

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Wayne Young
*Assistant Examiner* — Brian Butcher
(74) *Attorney, Agent, or Firm* — Fletcher Yoder

(57) ABSTRACT

The present techniques provide methods and systems for enhancing a data signal in reading optical discs, such as holographic data discs. The techniques involve adjusting the position of a detector, or multi-pixel detector, such that the reflection corresponding to a micro-hologram or micro-reflector is enhanced. For example, the detector position may be adjusted to a position where the surface reflection and the micro-hologram reflection constructively interfere, resulting in an amplified micro-hologram reflection signal. Other parameters such as disc reflectivity and detector pinhole size may be adjusted to increase signal enhancement. Furthermore, the detector position may be adjusted to a position where the phases of the surface reflection and the micro-hologram reflection result in a weaker cross term.

26 Claims, 6 Drawing Sheets

U.S. PATENT DOCUMENTS

| | | |
|---|---|---|
| 2006/0078802 A1 | 4/2006 | Chan et al. |
| 2006/0227398 A1 | 10/2006 | Lawrence et al. |
| 2007/0053029 A1 | 3/2007 | Raguin et al. |
| 2007/0097469 A1 | 5/2007 | Erben et al. |
| 2007/0146835 A1 | 6/2007 | Erben et al. |
| 2008/0055686 A1 | 3/2008 | Erben et al. |
| 2008/0063900 A1* | 3/2008 | Wu .......................... 428/823.1 |
| 2008/0117788 A1* | 5/2008 | Kasazumi et al. ............ 369/103 |
| 2008/0144145 A1 | 6/2008 | Boden et al. |
| 2008/0144146 A1 | 6/2008 | Boden et al. |

FOREIGN PATENT DOCUMENTS

| | | |
|---|---|---|
| WO | 2006125079 | 11/2006 |

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2-5:00.

U.S. Appl. No. 12/336,399, filed Dec. 16, 2008, John Erik Hershey et al.

U.S. Appl. No. 12/337,457, filed Dec. 17, 2008, John Anderson Fergus Ross et al.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

U.S. Appl. No. 12/342,794, filed Dec. 23, 2008, John Anderson Fergus Ross et al.

U.S. Appl. No. 12/343,204, filed Dec. 23, 2008, Ruediger Kusch.

U.S. Appl. No. 12/346,279, filed Dec. 30, 2008, Victor Ostroverkhov et al.

U.S. Appl. No. 12/346,378, filed Dec. 30, 2008, Xiaolei Shi et al.

U.S. Appl. No. 12/347,178, filed Dec. 31, 2008, Victor Ostroverkhov et al.

U.S. Appl. No. 12/347,211, filed Dec. 31, 2008, Xiaolei Shi et al.

* cited by examiner

```
index=0;

de     =  0.001
pinhole  =  0.1 for dr=0.0001 : 0.0001 : 0.1 index=index+1;

hol(index)  =   de * (1-dr) (1-dr);

cross_term(index)  =  2*sqrt(pinhole*de*dr*(1-dr) (1-dr));

dc_term(index)  =   pinhole*dr;

refl(index) = dr;

end plot(refl, hol, refl, cross_term, refl, dc_term)
title(['DE   =   ',num2str(de),',  pinhole reflection reduction  =   ',num2str(pinhole)]);
grid on
legend('holo term','max cross term','dc term from reflection')
xlabel('disk refelction')
```

FIG. 6

METHOD AND SYSTEM FOR DETECTION ENHANCEMENT FOR OPTICAL DATA STORAGE

BACKGROUND

The invention relates generally to data storage techniques for optical discs. More specifically, the techniques relate to enhancing reflections from a data bit in the optical disc by either reducing or taking advantage of reflections from a surface of the optical disc.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disc, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080 p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disc, or 50 GB in a dual-layer disc. As resolution of video displays, and other technologies, continue to develop, storage media with ever-higher capacities will become more important. One developing storage technology that may meet the capacity requirements for some time to come is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a data beam which contains digitally encoded data is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed data beam proportional to the initial data beam used to store the holographic image.

In bit-wise holography or micro-holographic data storage, every bit is written as a micro-hologram, or reflection grating, typically generated by two counter propagating focused recording beams. The data is then retrieved by using a read beam to diffract off the micro-hologram to reconstruct the recording beam. Accordingly, micro-holographic data storage is more similar to current technologies than page-wise holographic storage. However, in contrast to the two layers of data storage that may be used in DVD and Blu-ray Disc™ formats, holographic discs may have 50 or 100 layers of data storage, providing data storage capacities that may be measured in terabytes (TB).

Although holographic storage systems may provide much higher storage capacities than prior optical systems, the large number of layers that may be used may provide weak data signals that may be hard to detect over interferences. For example, reflections from bits in adjacent tracks and layers, or from the surface of the holographic storage system itself, may interfere with reading data.

BRIEF DESCRIPTION

A contemplated embodiment of the present techniques provides a method for reading data on an optical disc. The method includes emitting a beam of electromagnetic radiation at a surface of an optical disc, detecting a reflected electromagnetic radiation from the optical disc with a detector, and adjusting the detector to enhance the detection of the reflection from the micro-reflector. The reflected electromagnetic radiation includes a reflection from the surface and a reflection from a micro-reflector within the data storage medium.

Another contemplated embodiment provides a reader for optical storage media. The reader includes an optical excitation device configured to focus a laser beam on an optical disc, an optical detector, and a tracking unit. The optical detector is configured to detect a reflected light beam from the optical disc. This reflected light beam comprises a light reflected from the micro-reflector disposed within the optical disc and a light reflected from the surface of the optical disc. The optical detector is further configured to convert the reflected light beam into an electrical signal. The position of the optical detector may be adjusted by the tracking unit, such that the combined light is enhanced.

In another contemplated embodiment, the present techniques provide a method for enhancing a data signal from a reflected reading beam. The method includes receiving reflections of a reading beam at a detector, analyzing the reflections at more than one detection point, and adjusting the position of the detector to a point where the reflection from the data, or the micro-hologram, is enhanced.

In yet another embodiment, the present techniques provide an optical storage disc. The optical storage disc includes a data storage layer having a plurality of micro-reflectors configured to store data. The optical storage disc also includes a protective surface disposed over the data storage layer. The protective surface is configured to enhance a reflection of a read beam from a micro-reflector.

DRAWINGS

These and other features, aspects, and advantages of the present invention will become better understood when the following detailed description is read with reference to the accompanying drawings in which like characters represent like parts throughout the drawings, wherein:

FIG. 6 is a code listing illustrating a program that may be used to simulate the intensities of light received at a detector when varying the percentage of reflection from the surface of a disc in accordance with an embodiment;

DETAILED DESCRIPTION

Figure 1:
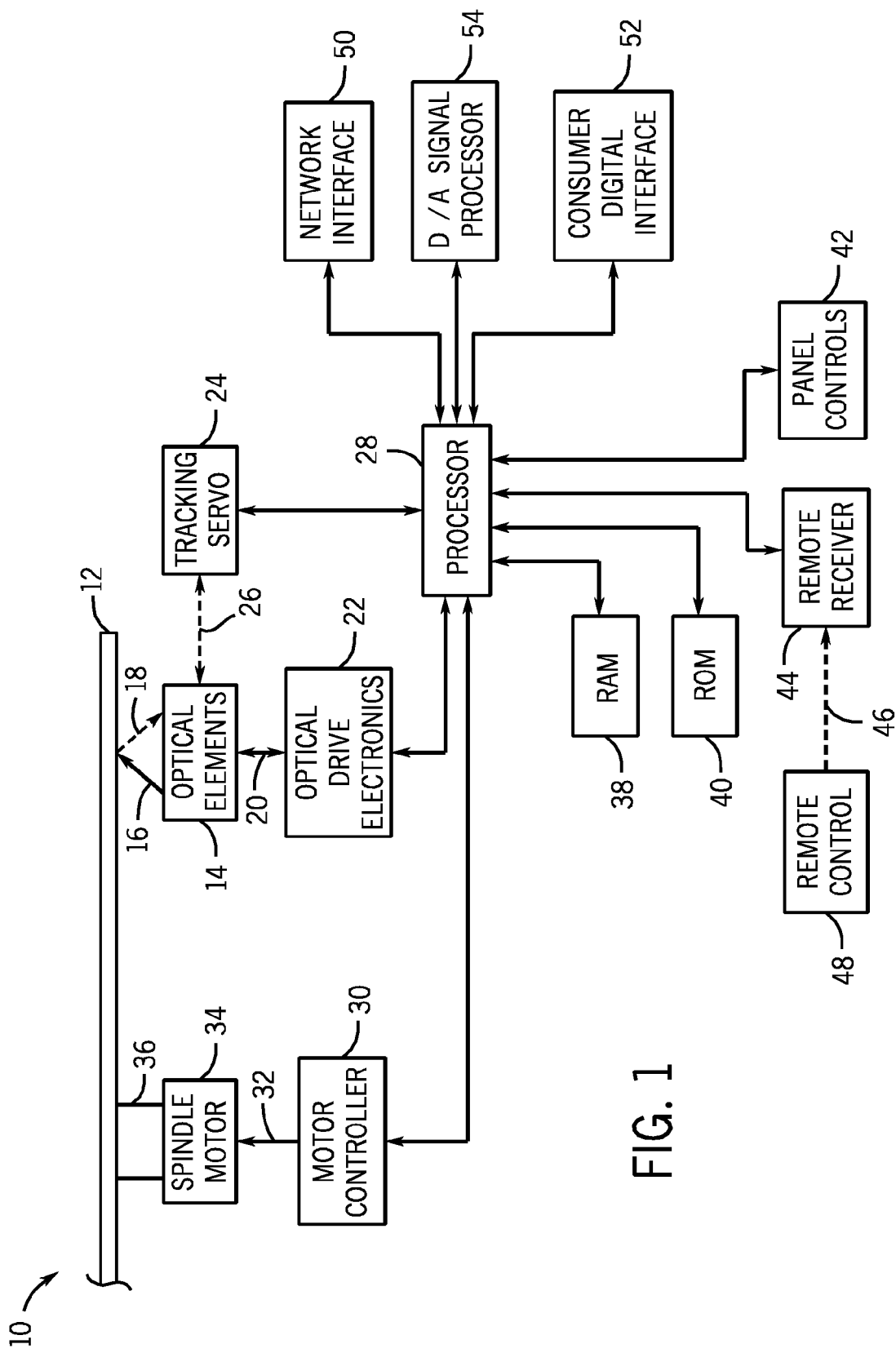
FIG. 1 is a schematic diagram of an optical disc reader, in accordance with embodiments of the present technique.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Data in a holographic storage system is stored within a photosensitive optical material using an optical interference pattern that allows data bits to be stored throughout the volume of the optical material. Data transfer rates in a holographic storage system may be improved, as millions of bits of holographic data may be written and read in parallel. Furthermore, multilayer recording in holographic storage systems may increase storage capacity, as holographic data may be stored in multiple layers of an optical disc. As previously described, data may be written by directing a recording beam (e.g., a laser) to a particular depth in the media and focusing the beam on a particular layer of information. The laser may also be focused on a selected point or position on the selected layer. The laser generates a photochemical change at the layer and/or position where the laser is focused, writing the data.

To read data in a multilayer holographic storage system, a reading beam may be directed to a data bit position at a particular layer in an optical disc, and the reading beam may pass through the surface of the optical disc to interact with the material at the data bit position. The interaction of the reading beam at the particular layer may generate a reconstructed data beam corresponding to an initial recording beam. For example, the reading beam may be reflected from a holographic data bit, and this reflected data beam may be proportional to the initial recording beam that wrote the holographic data bit. Though multiple recording layers increase the amount of data that can be stored, the configuration of the disc may result in a lower signal-to-noise ratio ("SNR"). More specifically, the recording layers may have lower reflectivity, resulting in a reflected data beam with lower amplitude. Further, while the reading beam is directed to a certain layer containing a data bit of interest, the reading beam may also be reflected by the surface of the optical disc, resulting in a reflected data beam containing interferences from the surface reflection in addition to the reflection from the data bit of interest. While the reflected data beam may dominate over the surface reflection in conventional optical data storage systems, the configuration of current holographic data systems may sometimes result in a surface reflection that cannot be ignored.

Technical effects of the invention include enhancing a data reflection by adjusting the position of a detector or adjusting the reflectivity of the disk surface. One embodiment of the present techniques involves adjusting the detector to a position where the data reflection is enhanced by the surface reflection. Another embodiment includes adjusting the detector to a position where surface reflection interference is minimized. Furthermore, embodiments of the present techniques may involve adjusting the reflectivity of the disc surface to enhance the data reflection.

In one embodiment, a detector may be configured to move in relation to an optical disc being read by the detector so that undesirable interferences from surface reflections of the optical disc may be minimized. This technique may be explained by the equation below, which represents the signal output of the detector that is proportional to the intensity of light received at the detector.

$$|E_d|^2 + |E_h|^2 + 2\text{Re}(E_d E_h^*)$$

$E_d$ represents the electric field at the detector due to disc surface reflection, and $E_h$ represents the electric field at the detector due to a reflection or refraction from a micro-hologram. As used herein, micro-hologram may refer to a micro-reflector, or to any other data symbol storage method. As discussed, when a reading beam is directed towards a micro-hologram, part of the reading beam may also be reflected by the surface of the disc. Thus, $E_d + E_h$, or the electric fields of both reflections, may be received at the detector.

Because the intensity of a beam is proportional to the squared magnitude of the electric field of a beam, the equation is the result of the squared the magnitude of the electric fields of the surface reflection and the micro-hologram reflection, or $(|E_d + E_h|)^2$. The term $2\text{Re}(E_d E_h^*)$ may refer to the cross term of the light intensities at the detector. In addition to the terms of the equation above, the light intensities resulting from other sources or reflections may also be detected.

The term $|E_d|^2$ may be significant when $E_d$ is of the same order, or is larger than $E_h$. As discussed, the reflection of the disc surface may be relevant in current holographic systems because a micro-hologram may have a lower diffraction efficiency, or the configuration of multiple layers in current holographic systems may result in a weaker $E_h$, resulting in undesirable interferences of the micro-hologram reflection by the surface reflection. Differential detection may be used to overcome the DC term $|E_d|^2$, as the term may be substantially constant, or may vary slowly with respect to the data terms. More specifically, when analyzing the intensity signal, the $|E_h|^2$ term may be stronger when a micro-hologram is present. However, the surface reflection intensity, or the $|E_d|^2$ term, may be strong enough to interfere with the signal. Differential detection may detect changes in a signal such that a substantially constant surface reflection (the DC term $|E_d|^2$) may be accounted for. However, even with the surface reflection removed, the micro-hologram reflection may still be a weak signal.

In one embodiment, the detector may be moved to a position in space where the phase difference of the reflection from the surface and the reflection from the micro-hologram is small. More specifically, the beams received at the detector may have different phases depending on the position of the detection point, and the different phases of $E_d$ and $E_h$ may result in the detector outputting different intensity values. The cross term may be large when the phase difference between $E_d$ and $E_h$ is small, and depending on the position in space at which the detector receives $E_d$ and $E_h$, the cross term may be stronger or weaker. Locations where the cross term is stronger or weaker may be sampled, either by a multiple-pixel detector, or by a single detector moved in space (e.g., a spinning disc system may enable multiple sampling of a particular data to be read), and the cross term intensity from each location may be output by the detector. For example, the detector may feed information regarding the strength of the cross term signal from these samples to a decision device, and a decision may be made to adjust the position of the detector.

The position of the detector may be adjusted based on the cross term signals to enhance the reflection of a micro-hologram being read. In some embodiments, the cross term may be used advantageously. For example, when the phase difference between $E_d$ and $E_h$ is small, the two reflections may constructively interfere in a way that amplifies detection of the micro-hologram reflection. This effect may be advantageous when $E_h$ is weak, as the cross term may be output by the detector as an amplified data signal. Therefore, the detector may feed sampling results to a decision device, and a decision may be made to adjust the position of the detector to a point where the cross term is strongest.

In some embodiments, a data reflection may be enhanced by adjusting the position of the detector to minimize the undesired interference from the surface reflection. In this embodiment, the detector may be adjusted to a position where the intensity of the surface reflection is the weakest Turning now to the figures, FIG. 1 is an optical reader system 10 that may be used to read data from optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The reflected beam 18 may include some combination of light reflected from a micro-hologram on the optical storage disc 12, light reflected from a surface of the optical storage disc 12, and some interaction of the light reflected from the micro-hologram and the light reflected from the surface. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 are controlled by a processor 28. In some embodiments in accordance with the present techniques, the processor 28 may be capable of determining the position of the optical elements 14, based on sampling information which may be received by the optical elements 14 and fed back to the processor 28. The position of the optical elements 14 may be determined to enhance and/or amplify the reflection 18 or to reduce interferences of the reflection 18. In some embodiments, the tracking servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
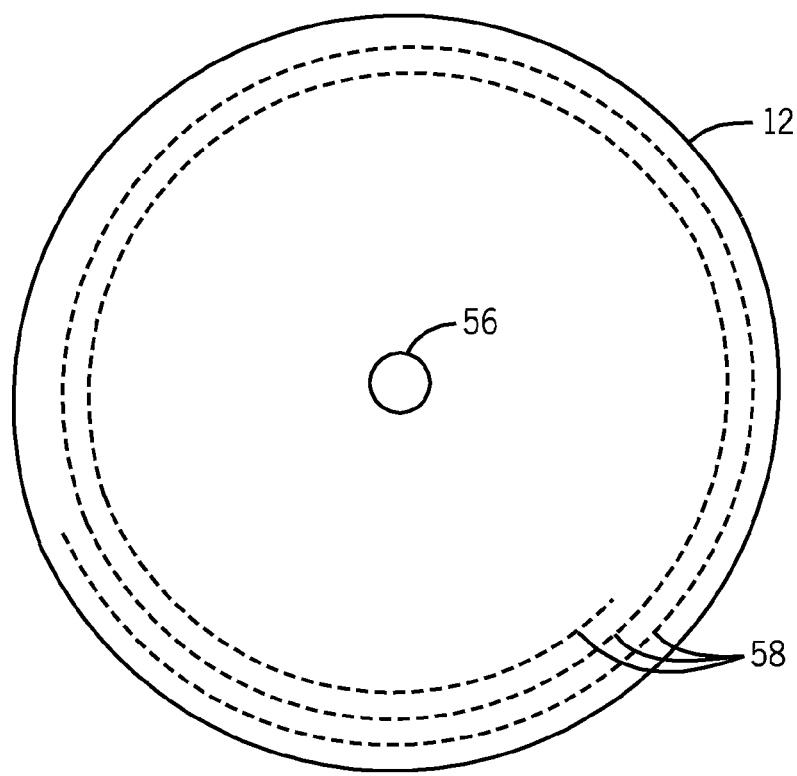
FIG. 2 is a top view of an optical disc that may be used in embodiments of the present techniques.

The reader 10 may be used to read an optical data disc 12 containing data as shown in FIG. 2. Generally, the optical data disc 12 is a flat, round disc with one or more data storage layers embedded in a transparent protective coating. The protective coating may be a transparent plastic, such as polycarbonate, polyacrylate, and the like. The data layers may include any number of surfaces that may reflect light, such as the micro-holograms used for bit-wise holographic data storage or a reflective surface with pits and lands. A spindle hole 56 couples to the spindle (e.g., the spindle 36 of FIG. 1) to control the rotation speed of the disc 12. On each layer, the data may be generally written in a sequential spiraling track 58 from the outer edge of the disc 12 to an inner limit, although circular tracks, or other configurations, may be used.

Figure 3:
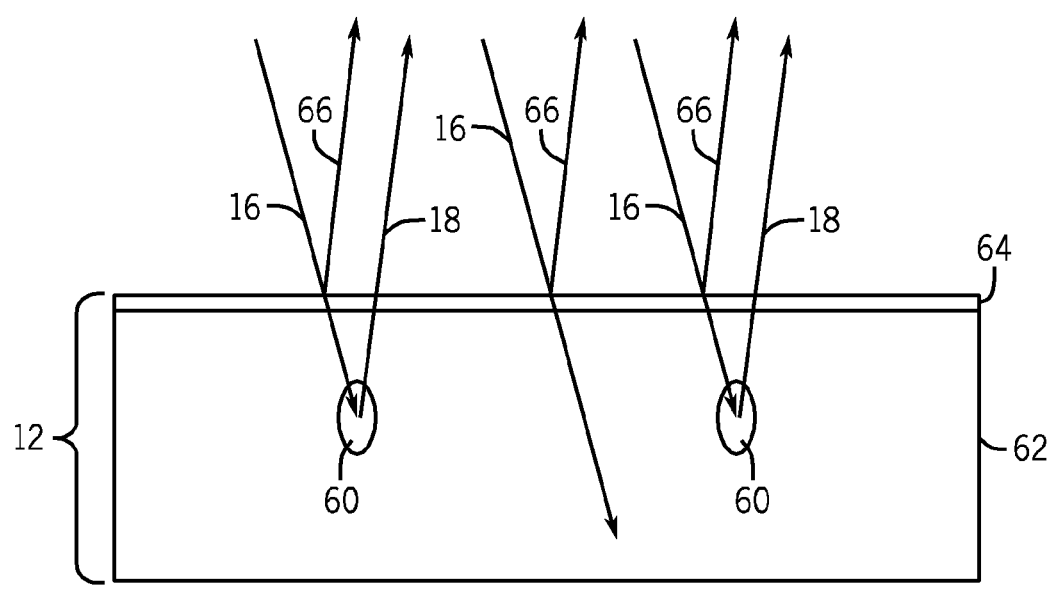
FIG. 3 is a cross-sectional view of an area of the optical disc of FIG. 2.

One embodiment of reading an optical data disc 12 in accordance with the present techniques is depicted in FIG. 3, which illustrates a cross sectional view of an optical disc 12 with reading beams 16 directed to the optical disc 12. The optical disc 12 may comprise a storage medium 62 which may include more than one layer of photosensitive optical material. These layers may include surfaces that may reflect light, such as micro-holograms. The optical disc 12 may further comprise a reflective surface coating 64 which may be a transparent plastic, such as polycarbonate, polyacrylate, and the like. To read the optical disc 12, a reading beam 16 may be directed to a data bit position at a particular layer in an optical disc 12, and the reading beam 16 may pass through the surface 64 of the optical disc 12 to interact with the material at the data bit position. At a data bit position, a micro-hologram 60 may either be present or absent. A micro-hologram 60 may reflect a reading beam 16, and a reflected beam 18 may exit the optical disc 12. The reading beam 16 may also be reflected by the reflective surface coating 64, and a surface reflection may also be reflected from the optical disc 12.

In one embodiment, if a micro-hologram 60 is present, the reflected beam 18 and the surface reflection 66 may both be received at a detector. The surface reflection 66 may create interferences with the reflected beam 18, which contains information corresponding to a micro-hologram 60. The detector may move over the optical disc 12 to a position where the surface reflection is weak, thus increasing the SNR by decreasing the interference from the surface reflection. However, decreasing interferences may be insufficient if the data signal itself is weak. In another embodiment, the detector may move to a position where the reflected beam 18 constructively interferes with the surface reflection 66 such that the reflected beam 18, or some component of the reflected beam 18 may be amplified or enhanced. For example, the detector may move to a position where the phases of the reflected beam 18 and the surface reflection 66 are substantially coherent, resulting in constructive interference and amplifying the reflected beam 18. When the phases of the reflected beam 18 and the surface reflection 66 are similar, the cross term may be stronger and may be output by the detector as an amplified data signal.

Thus, in some embodiments of the present technique, a high surface reflectivity may even be beneficial in amplifying and enhancing the reflected beam 18. Surface reflectivity may be adjusted to increase the surface reflection 66 to produce an even stronger cross term. For example, while conventional holographic systems may decrease the surface reflection 66 because the surface reflection 66 may be perceived as noise in a desired data signal, some embodiments of the present techniques may configure the surface of an optical disc to reflect about 10% to 50% of a read beam.

If the reading beam is directed to a data bit position where no micro-hologram is present, the reading beam 16 may not be reflected from the layer containing the data bit position of interest, and the reading beam may continue through the optical disc 12, as depicted in the middle reading beam 16. The surface reflection 66 may still be captured by a detector, and the returned signal of only a surface reflection 66 may indicate that the reading beam 16 has been directed to a data bit position where a micro-hologram is absent.

In FIG. 3, the reading beam 16, the reflected beam 18, and the surface reflection 66 are all entering and exiting from the optical disc 12 at angles. This illustration angles the beams 16, 18, and 66 so that their paths are easier to see and explain. In some embodiments, the reading beam 16 may be directed perpendicularly to the optical disc 12, and the reflected beam 18 and the surface reflection 66 may be reflected perpendicularly to the optical disc 12. Thus, the beams 18 and 66 may overlap or travel in the same path in space. This configuration may enable constructive interference between the reflected beam 18 and the surface reflection 66 as they are received at the detector.

Figure 4:
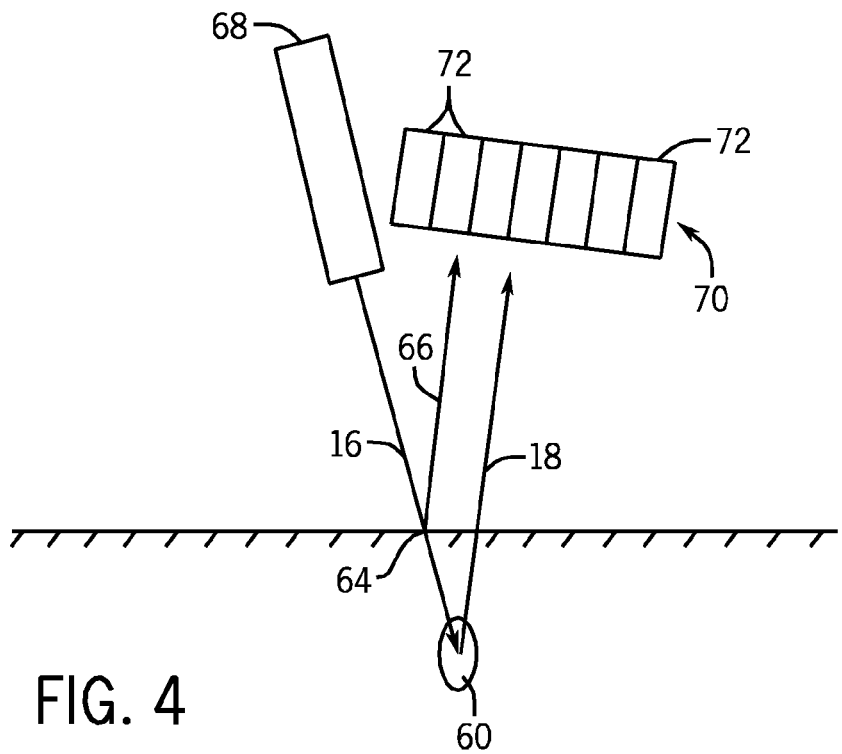
FIG. 4 is a schematic view of the reflections that result during the detection of a micro-reflector, in accordance with embodiments of the present techniques.

FIG. 4 illustrates a schematic view of the reflections that may result during the detection of a micro-hologram, in accordance with one embodiment of the present technique. The emitter 68 may emit a reading beam 16 directed towards a data bit position. At the data bit position, a micro-hologram 60 may be present, and the reading beam 16 may be reflected as the reflected beam 18. A surface reflection 66 may also result from the reading beam 16 being reflected from the reflective surface coating 64. The reflected beam 18 and the surface reflection 66 may result in a pattern, which may be read as a number of individual pixels 72 by a multi-pixel detector 70. The multi-pixel detector 70 may be adjusted depending on the pattern or on information contained in the pixels 72.

In one embodiment, the multi-pixel detector 70 may sample different positions in reading a certain data point position, and the position of the multi-pixel detector 70 may be adjusted to receive a signal with the highest SNR, or where interferences from the surface reflection 66 are the lowest. In other embodiments, the position of the multi-pixel detector 70 may be adjusted to capture the strongest signal. The strongest signal may refer to a signal where the reflected beam 18 constructively interferes with the surface reflection 66, resulting in the strongest cross term that is an enhancement of the reflected beam 18, or some component of the reflected beam 18. The enhancement may include amplification of a portion of or the entire reflected beam 18. In some embodiments, a single detector may also be used, and may sample positions for a particular data as the disc spins.

Figure 5:
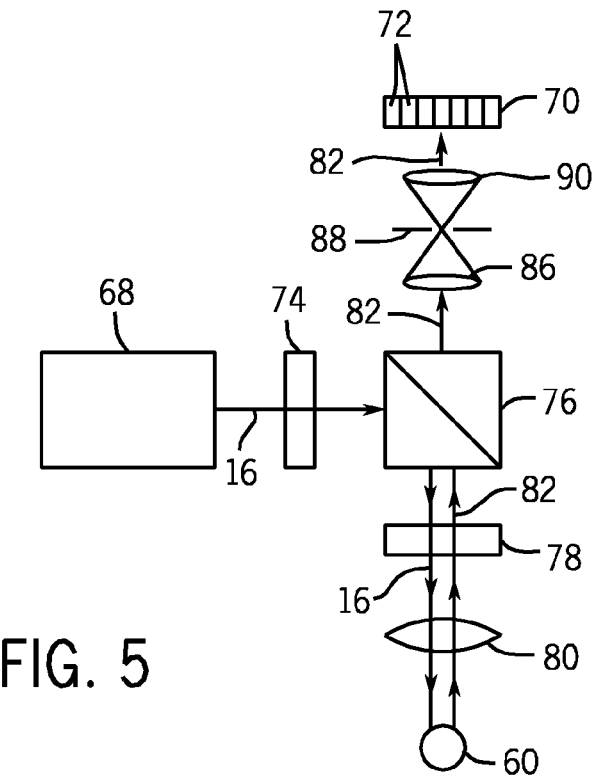
FIG. 5 is a schematic of a collinear detection head in accordance with embodiments.

A schematic of a collinear detection head in accordance with the present techniques is depicted in FIG. 5. The emitter 68 may emit a reading beam 16, and various reflections of the reading beam 16 may be received at a multi-pixel detector 70. The reading beam 16 may first pass through a half wave plate 74, which changes the polarization of the reading beam 16. The reading beam 16 may then enter a polarizing beam splitter 76 which may reflect substantially all of the reading beam 16 by 90° so that it is directed towards a quarter wave plate 78, which changes the polarization of the reading beam 16. The beam 16 may then enter a focusing optic 80, which may focus the beam 16 onto a data point position on an optical disc 12. The data point position may contain a micro-hologram 60. As discussed, the surface of the optical disc 12 may reflect a portion of the reading beam 16, and if a micro-hologram 60 is present, the micro-hologram 60 may also reflect a portion of the reading beam 16. The reflection of the beam from the surface and from the micro-hologram 60 may be reflected up from the optical disc 12, and cross talk, as previously discussed, may also result. The reflected beams 82 may all overlap, and may pass through the focusing optic 80 and back through the quarter wave plate 78 so that the polarization of the reflected beams 82 are shifted and now substantially pass through the polarizing beam splitter 76 towards the detector 70.

In some embodiments, the beams 82 may pass through a focusing optic 86, a pinhole plate 88, and collating optics 90 before the beams 82 are received at a multi-pixel detector 70. The beams 82 may produce a pattern which may be read as an array of individual pixels 72 by the multi-pixel detector 70.

An example of code illustrating a program that may be used to simulate the intensity of light corresponding with different fractions of disc surface reflection in accordance with an embodiment may be seen in FIG. 6. The equation previously discussed, $|E_d|^2+|E_h|^2+2\text{Re}(E_d E_h^*)$, may also be depicted in the code. Referring to the code, the term "de" represents the diffraction efficiency of the light reflected from the micro-hologram. The term "pinhole" represents a small hole through which a beam may pass before it is received by the detector. The pinhole may reduce the disk reflection by a pinhole factor set in this code. For example, in FIG. 6, the pinhole factor has been set to 0.1. The term "dr" represents the fraction of light that is reflected from the surface of the optical disc. The fraction of light that is reflected from the surface may be adjusted to create a plot to determine the relationship between the intensity of the beams 82 (as in FIG. 5) and the fraction of light reflected from the surface. Here, in defining dr, the first value of 0.0001 is the lowest fraction of surface reflection to be simulated. The second value of 0.0001 is the increment of increase for the surface reflection, and the third value of 0.1 is the highest fraction of surface reflection to be simulated. The intensity of light reflected from a micro-hologram is represented by "hol," which is calculated to be de*(1-dr)(1-dr). This may be because dr represents the fraction of light reflected by the surface, and so (1-dr) may represent the fraction of light that was not reflected by the surface and passed through the surface to be reflected by a micro-hologram. Not all the light reflected by the micro-hologram may be received at the detector, and the second (1-dr) term represents a reflection of the micro-hologram reflection from the bottom side of the optical disc surface. The second (1-dr) term may vary depending on the reflectivity of the bottom side of the optical disc surface. The term (1-dr)(1-dr) may be multiplied by the diffraction efficiency de because the reflection of the reading beam may not result in a reflected beam that is as intense as the original reading beam. The cross term is named "cross_term" in the code, and is calculated to be two times the square root of (pinhole*de*dr*(1-dr)(1-dr)). This may correspond to the previously discussed equation term $2\text{Re}(E_d E_h^*)$, and since this simulation also considers the fraction of light going through the pinhole before it is detected, the terms also include the pinhole measurement. Further, the DC term of the intensity of light reflected from the surface is represented by "dc_term" and calculated by pinhole*dr since the light must pass through the pinhole before it is received at the detector.

Though this code simulates the intensity of light reflections in accordance with an embodiment using MATLAB®, other programs or programming languages may be used for simulations in accordance with embodiments of the present technique. Further, other values or equations may be implemented in simulations in accordance with embodiments of the present technique.

Figure 7:
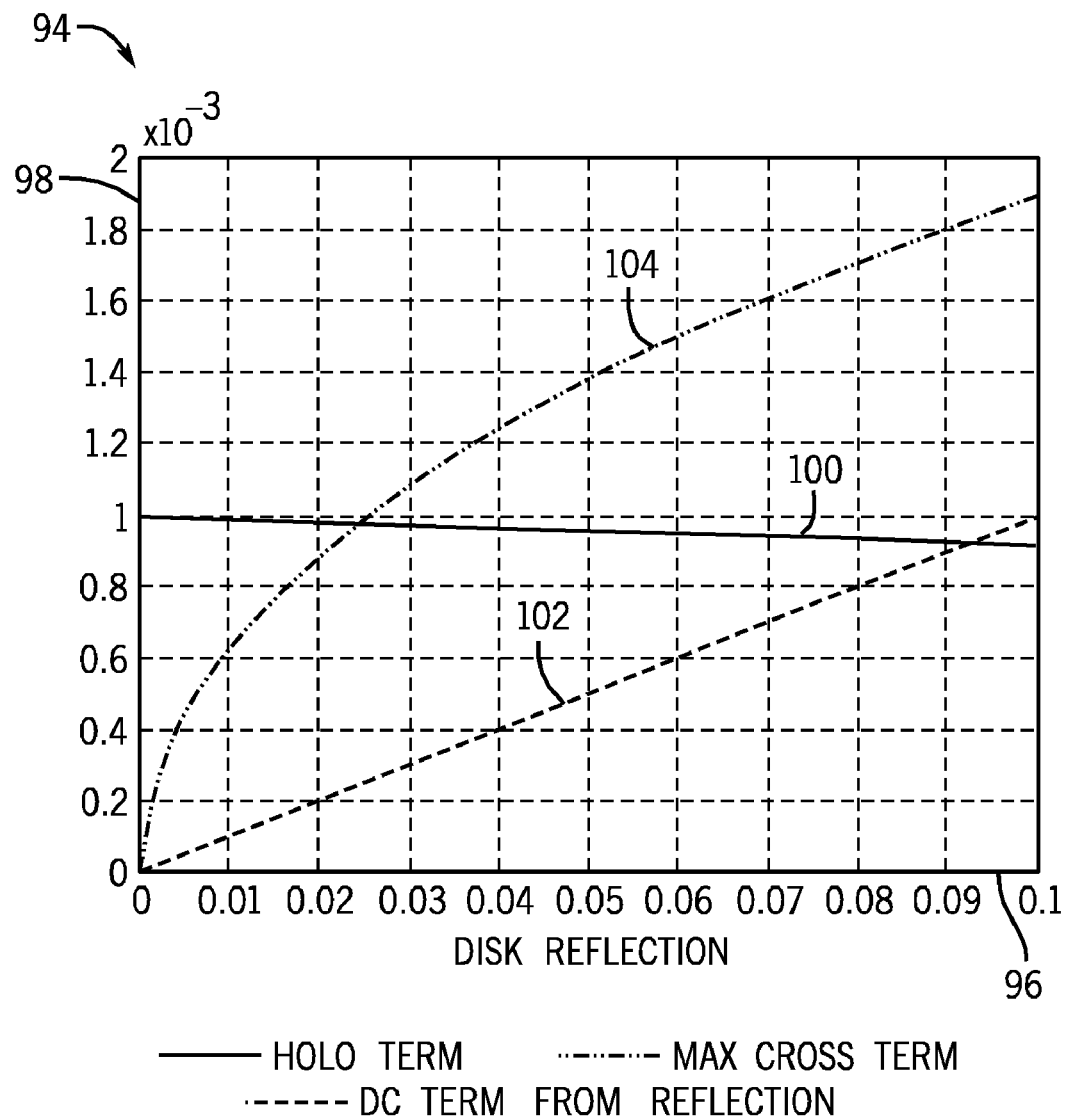
FIG. 7 is a chart showing the calculated relative intensities of light from the simulation program of FIG. 6 using a pinhole reflection reduction factor of 0.01, in accordance with an embodiment.

A chart showing the calculated intensities of light from the simulation program of FIG. 6 is depicted in FIG. 7, using a pinhole reflection reduction of 0.01, in accordance with an embodiment of the present techniques. In this simulation, the fraction of a reading beam that is reflected by the surface of a disc, or the disc reflection 96, is increased in increments of 0.0001 between 0.0001 and 0.1. The range of disc reflection 96 may result in a different intensity 98 for one or more of the beams received at a detector. The beams plotted in this simulation with a 0.01 pinhole reduction 94 include a reflection from the micro-hologram 100, a reflection from the optical disc surface 102, and a cross term 104. As discussed, the cross term 104 may interfere with the reading process, as the intensity of the cross term 104 includes components of both the micro-hologram reflection and the surface reflection.

As seen in this plot, the intensity of light reflected by a micro-hologram 100 may gradually decrease as the fraction of the reading beam reflected by the surface of a disc approaches 0.1. This may be because light that is reflected by the disc surface would not pass the surface material to be reflected by a micro-hologram in the photosensitive layers beneath the disc surface. The intensity of light reflected by the surface 102 may increase as the fraction of the reading beam reflected by the surface approaches 0.1. In this simulation, the strength of the cross term signal 104 also increases as the fraction of light reflected from the disc surface increases. As seen in this plot, the cross term 104 surpasses the micro-hologram reflection intensity between a surface reflection fraction of 0.02 and 0.03. While other simulations in accordance may result in different values, this simulation is an example of how a cross term signal may amplify a reflection signal from a micro-hologram. Consequently, adjusting a detector to a position where the cross term is strong may greatly increase the SNR and enhance the micro-hologram reflection.

Figure 8:
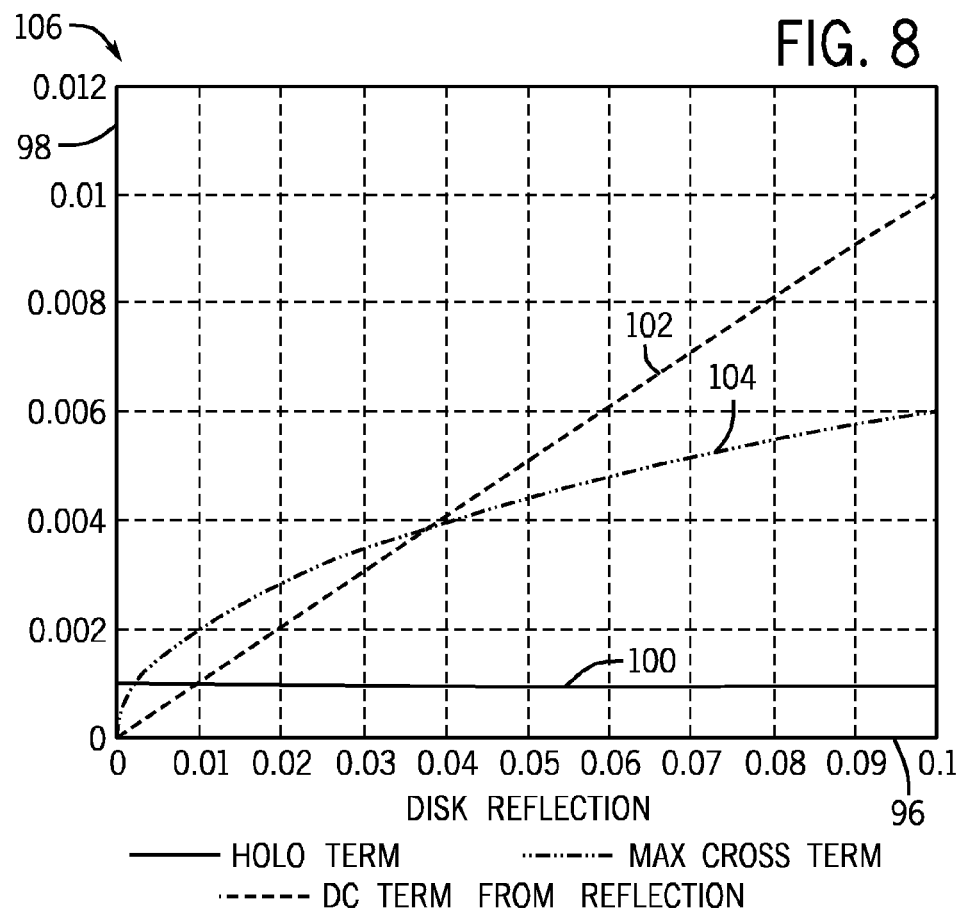
FIG. 8 is a chart showing the calculated relative intensities of light from the simulation program of FIG. 6 using a pinhole reflection reduction factor of 0.1, in accordance with an embodiment.

Further, a graph showing the calculated intensities of light from the simulation program of FIG. 6 is depicted in FIG. 8, using a pinhole reflection reduction of 0.1, in accordance with an embodiment of the present techniques. In this simulation, though a micro-hologram is present, the intensity of light reflected by a micro-hologram 100 remains low throughout the range of light reflected by the surface. The intensity of light reflected by the surface 102 and the strength of the cross term 104 may increase as the fraction of the reading beam reflected by the surface approaches 0.1. Thus, different intensities of micro-hologram reflection 100, surface reflection 102, and cross term 104 may be detected by varying different parameters. As previously discussed, adjusting the position of a detector may enable an optical reader system 10 (as in FIG. 1) to find a maximum (or minimum) cross term for constructive interference with a micro-hologram. As can be seen by comparing the charts in FIGS. 7 and 8, varying the size and location of the pinhole may also achieve a stronger cross term 104. The pinhole may function as a filter which enables certain signals to pass through to reach the detector. The size of the pinhole may determine the strength of a signal to pass through, and the position of the pinhole may determine the portion of a signal to pass through. Thus, both parameters of the pinhole may be used in enhancing signal detection capability or detecting a desired cross term 104. Furthermore, as previously mentioned, varying the reflectivity of the surface of the optical disc may also increase the cross term signal. A desired cross term signal 104 may be a maximum in-phase cross term, or a cross term output by the detector when the surface reflection and micro-hologram reflection are in-phase.

Figure 9:
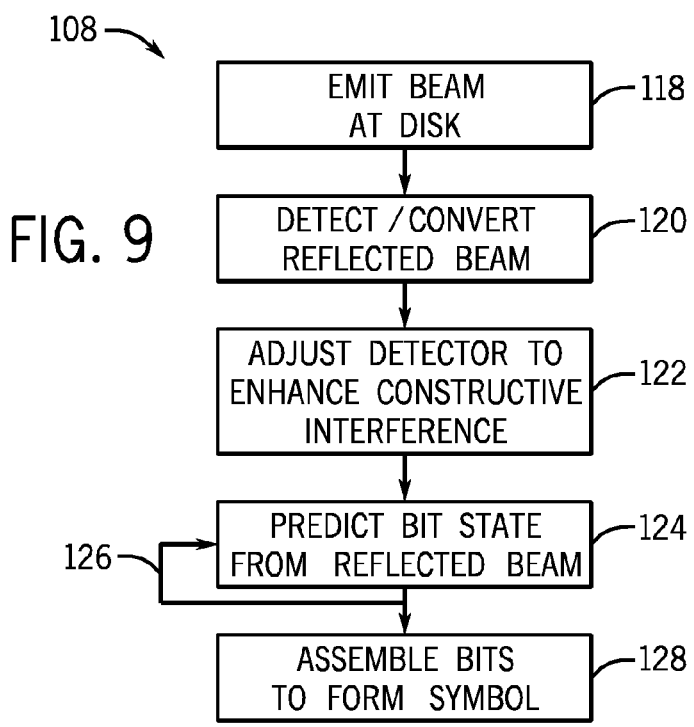
FIG. 9 is a block diagram illustrating a general procedure for reading a bit from an optical storage disc, in accordance with an embodiment.

FIG. 9 depicts a block diagram generally explaining a process 108 through which the optical reader system 10 may read at a data point position in an optical data disc, in accordance with embodiments of the present techniques. The process 108 begins in block 118, where a beam is emitted at a disc. For example, an emitter may emit a reading beam at an optical data disc. The reflected beam is detected and converted in block 120. This reflected beam may refer to any reflections of the beam emitted in block 118, which may include, for example, a reflection from the surface of the disc, a reflection from a micro-hologram in the disc, or other reflections. The converting process of block 120 may refer to any decoding or converting of data into an analog data signal, as previously described. The detection and conversion of the reflected beam in block 120 may include a detector or a multi-pixel detector which receives more than one sample of the beam reflection. The detector may be adjusted to enhance the component of the reflected beam corresponding to the reflection from the micro-hologram in block 122. The adjustment of the detector may be made according to the samples of the reflected beam detected in block 120.

In one embodiment, the adjustment, block 122, may be made to enhance the component of the reflected beam corresponding to the micro-hologram reflection by enabling its constructive interference with the surface reflection. Taking advantage of the surface reflection, and aligning a detector such that the surface reflection and the micro-hologram reflection constructively interfere, may result in a strong cross term of the surface reflection and the micro-hologram reflection, which may be an enhanced micro-hologram reflection. For example, a detector may be adjusted to a certain position where the surface reflection and the micro-hologram reflection have substantially the same phase. Sampling of more than one position when reading a particular data point position may enable the optical reader system to select a position where the surface reflection and the micro-hologram reflection are in-phase, and where the cross term is strong.

Furthermore, in some embodiments, an optical disc may be configured to deliberately reflect a percentage of the reading beam reflected by the surface. For example, the optical disc may be coated such that the surface may be more reflective than typical optical discs. While conventional optical disc surfaces may be configured to reflect a certain percentage of a reading beam, some embodiments in accordance with the present techniques may reflect approximately 1% to 50% of a reading beam. In some embodiments, the optical reader system 10 may be configured to read optical discs with higher reflectivity. Also, the optical reader system 10 may be configured to receive a reflection from a reflective optical disc surface that enhances a micro-hologram reflection signal by constructive interference.

In another embodiment, the detector adjustment, block 122, may be made to enhance the component of the reflected beam corresponding to the reflection of the micro-hologram by decreasing the undesirable effects of surface interference. As previously discussed, the surface reflection may dominate a signal or reflection from the micro-hologram reflection depending on how much light is reflected from the disc surface. Eliminating the disc surface reflection (e.g., by differential detection) may increase the SNR in the reading process. Also as discussed, the interferences may be decreased by moving or adjusting the detector, in block 122, to receive a reflected beam where interferences are minimal. Sampling of more than one position when reading a particular data point position may enable the optical reader system to select a position where the surface reflection is weakest.

In block 124, a bit state may be predicted from the reflected beam. For example, a bit may be in a "0" state or a "1" state, indicating that a micro-hologram is absent or present. Further, more than one bit state may be predicted 126, and the bit state(s) may be assembled to form a symbol in block 128. This symbol may be an output digital signal from the optical reader system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for reading data from an optical disc, comprising:
   emitting a beam of electromagnetic radiation at a surface of an optical disc;
   detecting reflected electromagnetic radiation from the optical disc with a detector, wherein the reflected electromagnetic radiation comprises:
      a reflection from the surface; and
      a reflection from a micro-reflector within the optical disc; and
   adjusting the detector to enhance the detection of the reflection from the micro-reflector, wherein adjusting the detector comprises adjusting the detector to a position where a phase of the reflection from the surface and a phase of the reflection from the micro-reflector are substantially the same.

2. The method of claim 1, comprising converting the reflected electromagnetic radiation into an electrical signal representative of an intensity of the reflected electromagnetic radiation.

3. The method of claim 1, wherein adjusting the detector comprises adjusting the position of the detector over the optical disc.

4. The method of claim 1, comprising directing an optical path of the emitted electromagnetic radiation in a collinear fashion with an optical path of the reflected electromagnetic radiation.

5. A method for reading data from an optical disc, comprising:
   emitting a beam of electromagnetic radiation at a surface of an optical disc;
   detecting reflected electromagnetic radiation from the optical disc with a detector, wherein the reflected electromagnetic radiation comprises:
      a reflection from the surface; and
      a reflection from a micro-reflector within the optical disc; and
   adjusting the detector to enhance the detection of the reflection from the micro-reflector; and
   adjusting a size and a position of a pinhole to enhance the detection of the reflection from the micro-reflector.

6. The method of claim 1, comprising analyzing the reflected electromagnetic radiation by differential detection.

7. The method of claim 6, wherein the differential detection detects a change in the reflected electromagnetic radiation, and wherein the change in the reflected electromagnetic radiation represents a presence or an absence of a micro-reflector.

8. The method of claim 1, comprising detecting the reflected electromagnetic radiation using a multipixel detector.

9. The method of claim 8, wherein adjusting the detector comprises selecting a pixel in the multipixel detector that detects the reflected electromagnetic radiation with an enhanced intensity.

10. A method for reading data from an optical disc, comprising:
    emitting a beam of electromagnetic radiation at a surface of an optical disc;

detecting reflected electromagnetic radiation from the optical disc with a detector, wherein the reflected electromagnetic radiation comprises:
  a reflection from the surface; and
  a reflection from a micro-reflector within the optical disc; and
adjusting the detector to enhance the detection of the reflection from the micro-reflector;
converting the reflected electromagnetic radiation into an electrical signal representative of an intensity of the reflected electromagnetic radiation; and
calculating an intensity of the reflected electromagnetic radiation;
feeding a bit predictor with inputs comprising the calculated intensity of the reflected electromagnetic radiation or the electrical signal, or both; and
predicting a bit value for a presently detected bit.

11. A reader for an optical disc, comprising:
an optical excitation device configured to focus a laser beam on an optical disc;
an optical detector configured:
  to detect a reflected light beam from the optical disc, wherein the reflected light beam comprises:
    a light reflected from a micro-reflector disposed within the optical disc;
    a light reflected from a surface of the optical disc; and
  to convert the reflected light beam into an electrical signal; and
a tracking unit configured to adjust the position of the optical detector to enhance the combined light; and
a bit predictor configured to analyze the electrical signal and predict the value of a currently read bit.

12. A reader for an optical disc, comprising:
an optical excitation device configured to focus a laser beam on an optical disc;
an optical detector configured:
  to detect a reflected light beam from the optical disc, wherein the reflected light beam comprises:
    a light reflected from a micro-reflector disposed within the optical disc;
    a light reflected from a surface of the optical disc; and
  to convert the reflected light beam into an electrical signal; and
a tracking unit configured to adjust the position of the optical detector to enhance the combined light,
wherein the light reflected from the surface of the optical disc is between 1% to 50% of the laser beam focused on the optical disc.

13. The reader of claim 11, wherein the optical disc is a holographic data disc.

14. The reader of claim 11, comprising an output device configured to output a data stream, wherein the output device comprises a network interface, a high-definition multimedia interface (HDMI), a digital video output, a digital audio output, an analog video output, an analog audio output, or any combinations thereof.

15. The reader of claim 11, wherein the optical detector comprises a multi-pixel detector configured to simultaneously detect reflected light along multiple paths.

16. The reader of claim 15, wherein the multipixel detector is configured to read multiple data tracks, multiple data layers, or both, in a parallel fashion.

17. The reader of claim 11 wherein the tracking unit comprises a servo-motor mechanism configured to move the optical detector laterally to reach a data track, and to hold an alignment along the data track.

18. The reader of claim 17, wherein the tracking unit is configured to adjust a tracking of the servo-motor mechanism based on feedback from the electrical signal, wherein the tracking is adjusted to enhance an intensity of the combined light.

19. A method for enhancing a data signal from an optical disc, comprising:
receiving reflections of a reading beam at a detector;
analyzing the reflections at more than one detection point;
adjusting the detector to a position where a reflection from a micro-hologram is enhanced; and
outputting an intensity signal, wherein the intensity signal is proportional to a
squared magnitude of a sum of:
  an electric field of a reflection from a surface of the optical disc; and
  an electric field of a reflection from a micro-hologram in the optical disc.

20. A method for enhancing a data signal from an optical disc, comprising:
receiving reflections of a reading beam at a detector;
analyzing the reflections at more than one detection point; and
adjusting the detector to a position where a reflection from a micro-hologram is enhanced, wherein analyzing the reflections comprises analyzing a cross term signal, wherein the cross term signal results from the interference of a reflection from a surface and the reflection from the micro-hologram.

21. The method of claim 20, wherein analyzing the reflections comprises selecting a reflection from a detection point where the cross term signal is strong.

22. A method for enhancing a data signal from an optical disc, comprising:
receiving reflections of a reading beam at a detector;
analyzing the reflections at more than one detection point; and
adjusting the detector to a position where a reflection from a micro-hologram is enhanced, wherein adjusting the detector comprises adjusting the detector to a position where the reflection from the micro-hologram constructively interferes with a reflection from a surface of the optical disc.

23. The method of claim 20, wherein analyzing the reflections comprises selecting a reflection from a detection point where the cross term signal is weak, and wherein adjusting the detector comprises adjusting the detector to the detection point where the cross term signal is weak.

24. An optical storage disc, comprising:
a data storage layer, wherein the data storage layer comprises a plurality of micro-reflectors configured to store data;
a protective surface disposed over the data storage layer, wherein the protective surface is configured to enhance a reflection of a read beam from a micro-reflector, wherein the protective surface is configured to reflect from about 1% to about 50% of the read beam.

25. The optical storage disc of claim 24, wherein the protective surface is configured to reflect a portion of the read beam, and wherein the portion of the read beam reflected by the protective surface constructively interferes with the reflection of the read beam from the micro-reflector.

26. The optical storage disc of claim 24, wherein the protective surface is a reflective coating configured to enhance the reflection of the read beam from the micro-reflector.

* * * * *